United States Patent
Balachandran et al.

(10) Patent No.: US 7,734,805 B2
(45) Date of Patent: Jun. 8, 2010

(54) METHOD FOR SCHEDULING TRANSMISSIONS IN COMMUNICATION SYSTEMS

(75) Inventors: Krishna Balachandran, Morganville, NJ (US); Kenneth C. Budka, Marlboro, NJ (US); Arnab Das, Washington, DC (US); Kameswara Rao Medapalli, Middletown, NJ (US); Minothi Parulekar, Bangalore (IN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1227 days.

(21) Appl. No.: 10/413,401

(22) Filed: Apr. 15, 2003

(65) Prior Publication Data

US 2004/0210619 A1   Oct. 21, 2004

(51) Int. Cl.
*G06F 15/16* (2006.01)
*G06F 15/173* (2006.01)
*H04B 7/216* (2006.01)

(52) U.S. Cl. .............. 709/232; 709/242; 370/320; 370/395.4

(58) Field of Classification Search .......... 709/226, 709/232, 223, 224, 242; 370/394, 329, 330, 370/320, 321, 395.4; 455/452.2
See application file for complete search history.

(56) References Cited

U.S. PATENT DOCUMENTS

| | | | | |
|---|---|---|---|---|
| 5,946,324 A * | 8/1999 | Mishra et al. | ............... | 370/468 |
| 6,393,012 B1 * | 5/2002 | Pankaj | ............ | 370/342 |
| 6,445,705 B1 * | 9/2002 | Holden et al. | ............... | 370/394 |
| 6,687,781 B2 * | 2/2004 | Wynne et al. | ............... | 710/317 |
| 6,807,426 B2 * | 10/2004 | Pankaj | ............... | 455/453 |
| 6,917,812 B2 * | 7/2005 | Damnjanovic | ............ | 455/452.2 |
| 7,027,392 B2 * | 4/2006 | Holtzman et al. | ............ | 370/230 |
| 7,130,639 B2 * | 10/2006 | Lee et al. | .............. | 455/452.2 |
| 7,298,719 B2 * | 11/2007 | Andrews et al. | ............. | 370/329 |
| 7,349,338 B2 * | 3/2008 | Balachandran et al. | ...... | 370/232 |
| 2001/0039582 A1 * | 11/2001 | McKinnon et al. | .......... | 709/226 |
| 2003/0199278 A1 * | 10/2003 | Lee et al. | ............ | 455/452.2 |
| 2003/0223451 A1 * | 12/2003 | Bi et al. | ...................... | 370/441 |
| 2004/0090974 A1 * | 5/2004 | Balakrishnan et al. | ...... | 370/412 |

FOREIGN PATENT DOCUMENTS

EP     1124356 A2     8/2001

OTHER PUBLICATIONS

Kapseok Chang; Youngnam Han, "QoS-based Adapted Scheduling for a Mixed Service in HDR System", IEEE International Symposium, vol. 4, Sep. 18, 2002, pp. 1914-1918.

(Continued)

*Primary Examiner*—Philip J Chea
(74) *Attorney, Agent, or Firm*—Harness, Dickey & Pierce (57) ABSTRACT

A method for scheduling transmissions to a plurality of users in a communication network determines a satisfaction metric and a dissatisfaction metric for each user in a given timeslot that is to be used for a next scheduled transmission to one of the users. Each user is assigned a weight based on a value of at least one of the user's satisfaction metric, the user's dissatisfaction metric and a rate requested by the user. The use having the highest weight is selected to be served the next scheduled transmission in the given timeslot.

10 Claims, 2 Drawing Sheets

OTHER PUBLICATIONS

Andrew S. Tanenbaum, "Computer Networks", Jan. 15, 1996, Prentice Hall PTR, pp. 379-384.
Puqi Perry Tang et al., "Network traffic characterization using token bucket model", Infocom '99 IEEE, Mar. 21, 1999, pp. 51-62.
European Search Report dated Aug. 16, 2004.
Matthew Andrews et al., "Providing Quality of Service over a Shared Wireless Link," *IEEE Communications Magazine*, Feb. 2001, pp. 150-154.
European Search Report dated Mar. 23, 2006 for EP Application No. 05014979.
European Search Report dated Mar. 23, 2006 for EP Application No. 05014978.
European Search Report dated Mar. 28, 2006 for EP Application No. 05014980.

* cited by examiner

METHOD FOR SCHEDULING TRANSMISSIONS IN COMMUNICATION SYSTEMS

BACKGROUND OF THE INVENTION

1. Field of the Invention

The present invention relates generally to scheduling transmissions in communication systems.

2. Description of Related Art

New technical challenges emerge as telecommunication systems evolve from a second generation system offering pure voice services to a third generation system providing mixed voice and data services. In meeting data service demands, new performance metrics and algorithms need to be defined in order to optimize data performance.

The CDMA 3G-1x Evolution Data Only system (1x-EV-DO, also known as a High Rate Packet Data (HRPD) system) is an evolution system of cdma2000 3G-1x system, and is a pure data system to provide data services to mobile users. In 1x-EV-DO, a scheduler or scheduling function is provided in a base station controller in order to provide fast scheduling or management of system resources based on channel quality feedback from one or more mobiles. In general, a scheduler selects a mobile for transmission at a given time instant, and adaptive modulation and coding allows selection of the appropriate transport format (modulation and coding) for the current channel conditions seen by the mobile.

In second generation wireless communications systems such as those of the IS-95 standard, applications typically employ voice-based communication schemes, in which a connection between the base station and the mobile is a dedicated connection. Since these are essentially fixed connections, there is no need for prioritizing the order of transmission to the active users served by the system (an active user is a user with data to transmit at a current time instant). However, with the emergence of third generation wireless data communications systems, such as CDMA-2000 standard systems and 1x-EV-DO, management of system resources is paramount. This is because properties of data differ significantly from properties of voice. For example, a data transmission, unlike a voice transmission, is not necessarily continuous and may be embodied as a burst transmission or an intermittent-type transmission between a base station and a mobile, for example. Accordingly, a base station in a third-generation system will attempt to manage a large pool of data users by assigning radio resources to each user for transmission. Typically this is done utilizing a prioritization scheme controlled by a scheduler in the base station controller. In a conventional prioritization scheme, idle mobile's are assigned a lower priority than mobile with data to transmit.

Accordingly, the scheduler must be able to manage these large numbers of users without wasting radio resources of the communication system. This management function becomes even more important as a base station attempts to meet QoS (Quality of Service) requirements. QoS is a general term that may represent a number of different requirements. As a basic tenant, QoS is indicative of providing guaranteed performance (e.g., such as a minimum/maximum data network throughput, a minimum delay requirement, a packet loss rate, and a packet download time, etc.) in a wireless communication system.

Quality of Service (QoS) differentiation in wireless data networks allows network operators to generate more revenue than is possible with best-effort scheduling policies. The promise of additional revenue is based on the willingness of end users (subscribers) to pay more for perceptible improvements in service (e.g., lower latency, higher throughput, or more predictable performance). QoS differentiation also enables deployment of new services (e.g., streaming audio/video, packet voice etc.) that cannot be provided with acceptable quality over best-effort scheduling policies or algorithms such as highest rate user first (HRUF)) scheduling, maximum carrier to interference ratio scheduling (Max C/I) and proportional fair (PF) scheduling, etc.

There has been efforts to develop scheduling algorithms for the scheduler in the base station controller to achieve QoS guarantees in wired and wireless networks. Prior efforts have resulted in scheduling techniques such as pure peak picking scheduling (i.e., the aforementioned HRUF or Max C/I)) and proportional fair (PF) scheduling, for example. HRUF maximizes system throughput at the expense of being unfair to users in poor channel conditions. For example, in HRUF scheduling, a user at a significant distance from a serving base station, such as a user that may be located at the edge of a cell, for example, would have significantly lower priority, on average, than a user in close proximity to the base station within the cell. When the variation of the channel is small, this can potentially result in the user at the edge of cell getting almost no service. Similarly, Max C/I assigns priority to users based on the highest signal-to-noise ratio (SNR) of the user.

The PF algorithm attempts to exploit multi-user diversity while ensuring a certain degree of fairness. In Proportional Fair scheduling, the scheduler keeps track of two values, in particular, for each user: DRC and R. On the downlink of a wireless network, for example, each user will estimate its signal to noise ratio (SNR) for the next timeslot, and on that basis will select a rate for transmission of downlink data from the base station. The selection will typically be the highest available rate consistent with a specified frame error rate, or other such error rate. The transmission rate requested by a given user in a given timeslot is DRC.

The second value, R, is the rate at which a given mobile station (user) has received data from the base station, or other hub, as averaged by an appropriate procedure such as exponentially weighted averaging using a desired time constant. In each timeslot n, the Proportional Fair scheduler will serve that user for which the ratio DRC/R is greatest. Thus, each user tends to receive service in those timeslots where its requested rate is highest—not in an absolute sense, but, rather, highest relative to the average rate (average user throughput) at which that particular user has been receiving data in the recent past. Because that average user throughput rate will be small for underserved users, even a user with a poor channel will eventually be served. That is, the average rates are dynamic quantities, and they will converge toward a condition in which each user is served reasonably often.

Since none of the above algorithms explicitly attempt to satisfy minimum user throughput requirements, use of these algorithms may lead to a high degree of dissatisfaction among users. For example, certain minimum throughputs are required in order to provide certain services such as audio or video streaming; thus scheduling algorithms which do not meet these minimum throughput requirements may not be able to offer such services. Further, the above algorithms do not focus on ways of enforcing maximum user throughput to exploit peaks in channel quality being experienced by users in the network or system. In order to constrain the maximum throughput achieved by a user in a network, most scheduling algorithms, including the HRUF and PF algorithms described above, simply disallow a user from being scheduled once the user reaches a target maximum throughput constraint.

SUMMARY OF THE INVENTION

A method for scheduling transmissions to a plurality of users in a communication network determines a satisfaction metric and a dissatisfaction metric for each user in a given timeslot that is to be used for a next scheduled transmission to one of the users. Each user is assigned a weight based on a value of at least one of the user's satisfaction metric, the user's dissatisfaction metric and a rate requested by the user. The use having the highest weight is selected to be served the next scheduled transmission in the given timeslot.

BRIEF DESCRIPTION OF THE DRAWINGS

Exemplary embodiments of the present invention will become more fully understood from the detailed description given herein below and the accompanying drawings, wherein like elements are represented by like reference numerals and prime and multiple prime notation indicates similar elements in alternate embodiments, which are given by way of illustration only and thus do not limit the exemplary embodiments of the present invention and wherein.

DETAILED DESCRIPTION OF EXEMPLARY EMBODIMENTS

The following description may be described as based on a wireless communication system operating in accordance with the cdma2000 1x-EV-DO standard. Although the exemplary embodiments of the present invention will be described in this exemplary context, it should be noted that the exemplary embodiments shown and described herein are meant to be illustrative only and are not limiting in any way. As such, various modifications will be apparent to those skilled in the art for application to other communications systems, such as the Universal Mobile Telecommunications System (LMTS) as reflected in the high-speed downlink packet access (HSDPA) system specification, for example, and are contemplated by the teachings herein.

The exemplary embodiments of the present invention are directed to a method for scheduling transmissions so as to (1) maximize user satisfaction by achieving QoS class-specific minimum throughput targets; and (2) to enforce QoS class-specific maximum throughputs to provide users with an incentive to upgrade service and potentially reduce sector activity.

Where used below, a mobile station is a device providing data connectivity to a user. A mobile station may be connected to a computing device such as a laptop, personal computer (PC), or it may be a self-contained data device such as a personal digital assistant (PDA) or cellular phone. Accordingly, a mobile station is equivalent to, and may be also be referred to as, an access terminal, wireless mobile, remote station, user, user equipment (UE), subscriber or any other remote user of wireless resources in a wireless communications network. Further, a mobile station may be functionally divided into a computing device such as a PC, which is responsible for point-to-point protocol (PPP) and higher later protocol functionality (IP, TCP, RTP, HTTP, etc.) and an access terminal (AT). The AT is responsible for the airlink and radio link protocol (RLP) layers.

Additionally as used herein, a base station refers to network equipment providing data connectivity between a packet data network (e.g., the Internet) and one or more mobile stations. A base station may be equivalent to, and may also be referred to as a base transmitter station or Node-B. An access network or RAN may be composed of one or more base stations.

As used herein, the transmission rate requested by a given user in a given slot, and/or the maximum downlink data rate achievable by a user in a given slot, is referred to as a DRC. The DRC may be embodied as part of a Reverse Traffic Channel or as part of a Reverse Control channel, i.e. a DRC channel. The DRC channel indicates the rate at which the user can receive a Forward Traffic Channel that carries specific information for that user, as well as the sector of the cell from which the user wishes to receive the Forward Traffic Channel from the base station serving the user.

Further, in the following discussion, transmission rates are expressed in bits per timeslot and numerically equal to the rate over that timeslot. Additionally, when the amount of data served or a "token count" is said to be incremented or decremented by a "rate," what is actually meant is the amount of data delivered at that rate in one timeslot.

Figure 1:
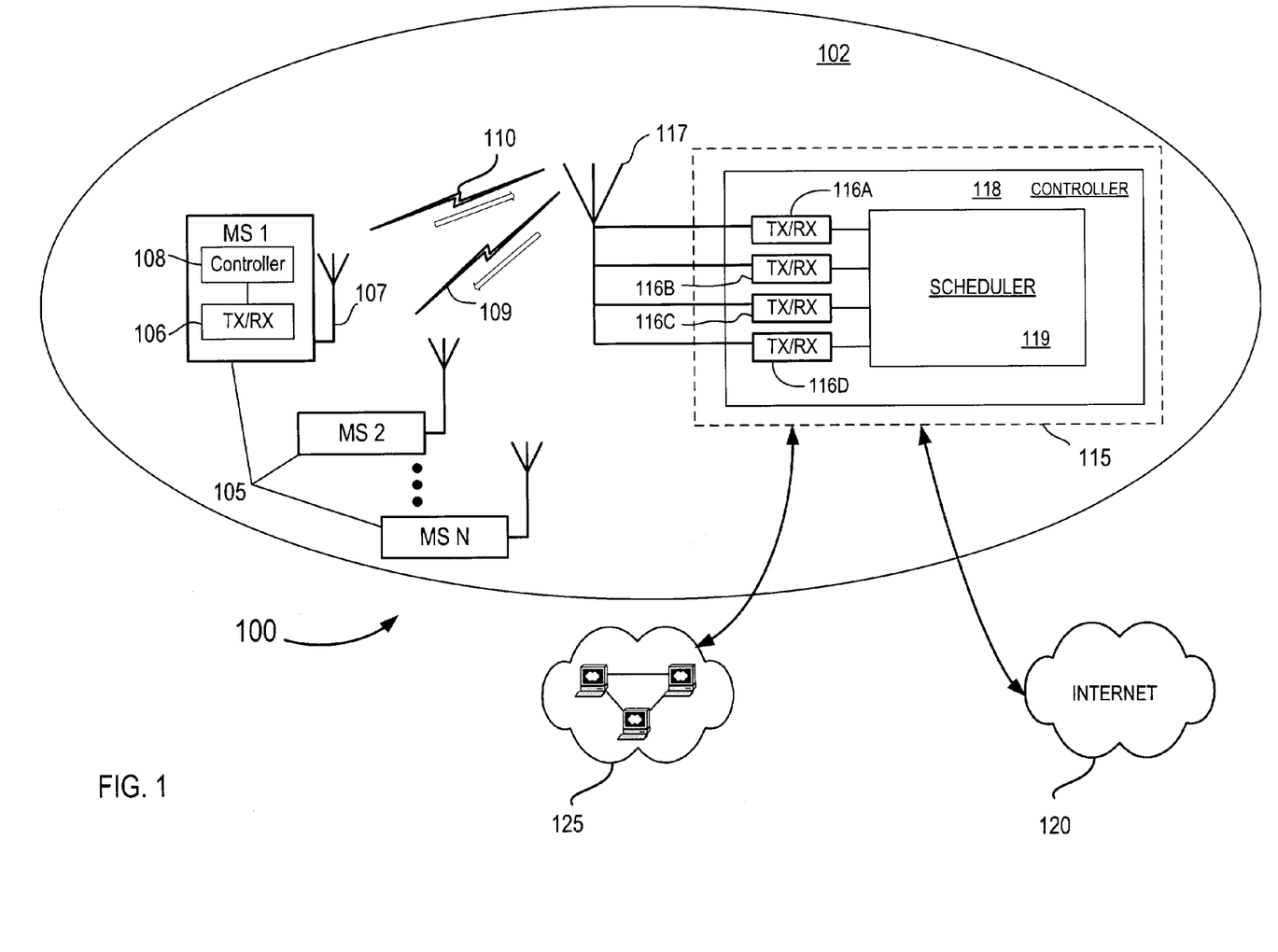
FIG. 1 is a block diagram of a communication system in accordance with an exemplary embodiment of the present invention.

FIG. 1 is a block diagram of a communication system in accordance with an exemplary embodiment of the present invention. System 100, which may also be configured as an high rate packet data (HRPD) system employing 1x-EV-DO technology, for example, may be illustrated by a cell 102 containing one or more mobile stations 105 in communication with, or served by a base station 115. Mobile station 105 may communicate through base station 115 to exchange packet data with the Internet 120 or some other packet data network 125, such as a closed corporate network (e.g., intranet) for example. Examples of packet data may include Internet Protocol (IP) datagrams used for applications such as accessing web pages and retrieving email. Such packet data applications may run on mobile station 105, or may run on a separate computer device that uses mobile station 105 as a wireless modem. In an exemplary embodiment, mobile station 105 may communicate with wireless network 115 over an air interface, which may be a set of forward and reverse channels for example. This may be shown as forward link 107 and reverse link 110.

Base station 115 may consist of a single base station and base station controller. Each base station may have a predetermined number of traffic channels to use for exchanging data with mobile stations 105. When one of the traffic channels is assigned to a mobile station 105, that mobile station 105 may be referred to as an active mobile station 105. At least one traffic channel is assigned to each active mobile station 105.

Base station 115 may be connected with packet data network 120 using back-haul facilities such as T1/E1, STM-x, etc, or any other appropriate type of network connection, such as wireless or wire-line T3, fiber optic connection, Ethernet, etc. Base station 115 may be connected to multiple packet data networks having more than one type of networks. For example, instead of an intranet, another network 125 might be a public switched telephone network (PSTN) connected with base station 115 through a data services inter-working function (IWF).

In FIG. 1, base station 115 illustratively comprises a plurality of transceivers 116A-D, an antenna 117 connected to each transceiver, and a base station controller 118 connected with and controlling each of the transceivers 116A-116D. The controller 118 may include an airlink scheduler 119 which may implement a scheduling function or algorithm, for example. The mobile stations 105 are identical or substantially similar to one another in terms of functionality. It suffices, therefore, to describe a single mobile station 105 which illustratively comprises a transceiver 106, an antenna 107 connected thereto, and a controller 108 also connected to the transceiver 106. Although controller 108 is shown as part of base station 115, base station controller functions could be implemented by an external server which communicates with the base station 115 via a private IP network (not shown), for example.

Each of the plurality of mobile stations 105 communicates with the base station 115 and transmits thereto, in reverse link 110, a requested service rate (e.g., data rate request) DRC(n, i), n representing the n-th time slot for a transmission of data and i indicating the mobile station transmitting the requested service rate. The base station 115 allocates a next transmission of data in the n-th time slot. The allocation may be made according to a scheduling operation performed by scheduler 119 that may prioritize the plurality of mobile stations 105, so as to provide enhanced throughput control when implemented by the base station controller 118.

On the forward link 107, Time Division Multiplexing (TDM) may be employed to transmit data from the base station 115 to mobile stations 105. Downlink transmissions occur at fixed time intervals, or timeslots (hereinafter referred to as "slots", each slot having a fixed duration of 1.667 ms). A preamble within each slot indicates the user to whom this slot is allocated. Every mobile station 105 that can decode the pilot of the base station 115 performs an estimate of the channel between the base station that transmitted the pilot and itself. The base station 115's sectors to which the mobile station 105 has the best channel are included in the mobile station 105's active set, as in IS-95 and cdma2000 systems. However, unlike those systems, the mobile station 105 requests transmission from only one sector (the strongest one) served by base station 115 at any given time.

Scheduler 119 determines which mobile station 105 to transmit to in each slot. Since the scheduler 119 resides at the base station 115, the scheduler 119 may have the ability to quickly react and exploit the temporary peaks in different users' (mobile stations 105) channel conditions (channel condition is implicitly reported by the mobile station 105, as explained in further detail below), potentially optimizing the overall performance and capacity of the system 100.

The forward-link 107 may employ Incremental Redundancy (IR) for which a supporting physical layer acknowledgment/negative acknowledgment (ACK/NACK) procedure is employed. IR is a flexible approach that allows Hybrid Automated Repeat Request (HARQ) combining of copies of the original transmission that use potentially different modulation schemes. In general, HARQ allows combining of the original transmission with the new transmission, rather than to discard the original transmission. This greatly improves the probability of correct decoding of the packet. The word "hybrid" in HARQ indicates that Forward Error Correction (FEC) techniques have been used in addition to ARQ techniques. IR may help to ensure that transmissions resulting in unsuccessful decoding, by themselves, are not wasted.

Every mobile estimates the quality of the downlink channel. Based on this estimate, each mobile station 105 predicts the received SNR at a given instant of the downlink channel. The predicted SNR is then used to predict the maximum downlink data rate achievable, or in other words the DRC, for a target packet error rate of about 1%. The DRC is embodied as a four-bit value on the DRC channel. The four-bit DRC values, which map to rates 38.4, 76.8, 153.6, 307.2, 614.4, 921.6, 1228.8, 1843.2 and 2457.6 Kb/s, for example, are fed back by each mobile station 105 on the DRC channel in reverse link 110. This information may be used by the scheduler 119 to assess the quality of each user's downlink channel, thus enabling peak-picking, e.g., scheduling the highest rate user first in a current slot to receive the downlink transmission.

Depending on coding rate selected and the quality of the channel, transmission of a single frame, such as a Radio Link Protocol (RLP) frame from the base station 115, may span multiple airlink slots. In 1x-EV-DO, IP packets belonging to a user are segmented into fixed, 128-byte RLP frames at the base station controller, which may or may not be part of the base station. Functions of the base station controller may be implemented by an external server communicating with a base station via a private IP network, for example, and then transported to the base station. Depending on the DRC feedback received in the DRC channel from the mobile station, the base station decides how many RLP frames can be sent in a slot and the corresponding modulation and coding scheme. If the mobile station receives an RLP frame in error, it sends a NACK (Negative Acknowledgment) and the RLP frame is re-transmitted. Only one retransmission is allowed per RLP frame. Once the mobile station receives all the RLP frames belonging to a PPP frame, the PPP frame is re-assembled and handed over to the PPP layer for further processing.

Some slots are "reserved" for RLP frames that were indicated by the mobile to be in error through the physical layer ACK/NACK mechanism and hence are in the process of being transmitted to a mobile station 105. Unreserved slots, however, can be allocated to any mobile station 105. If a slot is unreserved, a scheduling function in accordance with an exemplary embodiment of the present invention may be invoked by scheduler 119 to determine which of the mobile stations 105 with pending downlink data and suitable link performance should be allocated the slot. A DRC value of 0 is used by mobile stations 105 to inform the base station 115 that the downlink channel has an unacceptably high error rate. If the slot is reserved, implying that there was a mobile station 105 that sent a NACK for a transmission before, then the base station 115 transmits some more coded bits to the mobile station 105 in the current slot.

As will be seen in further detail below, the method in accordance with the exemplary embodiments of the present invention employs class-specific minimum and maximum rates. Class-specific may be defined as classes of users that are arranged based on how much each user or subscriber pays for specified services and data rates, for example. Alternatively, class could be based on the nature of traffic a user may be carrying, for example, real time, non-real-time, etc. At each unreserved slot, the scheduler 119 selects a user (mobile station 105) in such a way that these minimum and maximum rates are enforced over a suitable time horizon.

Figure 2:
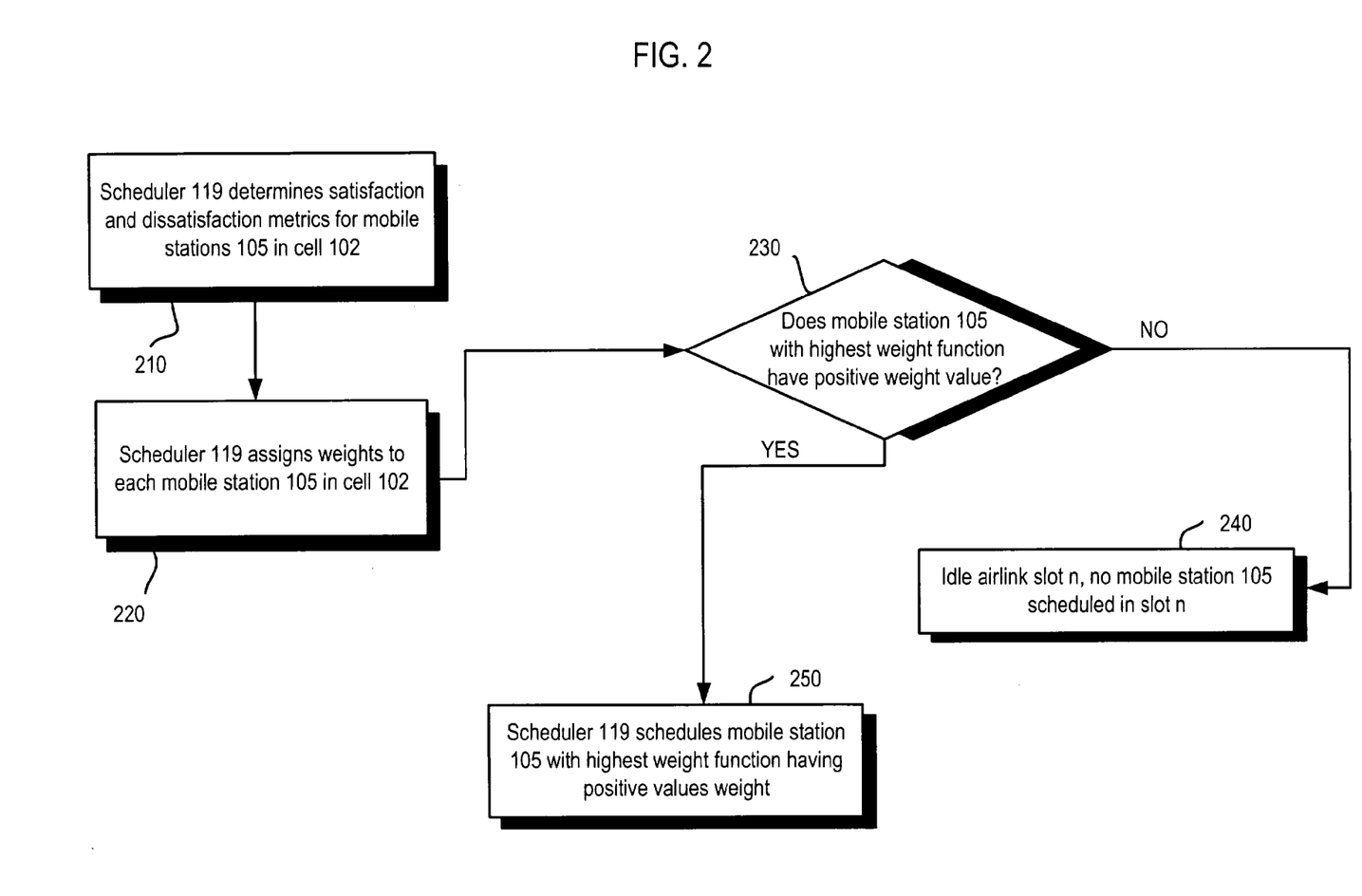
FIG. 2 is a flow diagram illustrating a scheduling method in accordance with an exemplary embodiment of the invention.

FIG. 2 is a flow diagram illustrating a scheduling method in accordance with an exemplary embodiment of the invention. Referring to FIG. 2, in general, a satisfaction metric and a dissatisfaction metric may be determined (function 210) by scheduler 119 for each mobile station 105 at a particular time instant (slot n). As will be seen in further detail below, the satisfaction metric may be embodied as a token count of a first token counter in scheduler 119 that tracks a mobile station 105's ($i^{th}$ user's) achieved performance relative to a target maximum throughput, hereinafter referred to as $R_i^{max}$. The dissatisfaction metric may be embodied as a token count of a second token counter that tracks a mobile station 105's ($i^{th}$ user's) achieved performance relative to a target minimum throughput, hereinafter referred to as $R_i^{min}$. $R_i^{max}$ and $R_i^{min}$ may be determined by the scheduler 119 as a function of a quality of service (QoS) class of the mobile station 105 as assigned by the network. Alternatively, $R_i^{max}$ and $R_i^{min}$ may be a function of a QoS class requested by the mobile station 105 at the start of a data session between the mobile station 105 and base station 115. As will be seen in further detail below, the token counts in the first and second counters may be temporally updated (updated in time) for a mobile station 105 after each scheduled transmission, for example, and may also be restricted within a given token range. The token counters may be software routines implemented by scheduler 119.

The satisfaction and dissatisfaction metrics may be a positive value or a negative value. Once the satisfaction and dissatisfaction metrics have been determined, each mobile station 105 is assigned (function 220) a weight by the scheduler 119. The weight may be based on one or more of a value of the mobile station 105's satisfaction metric, dissatisfaction metric and rate requested by the mobile station 105 (DRC). If the mobile stations 105 are transmitted SNR data to the base station 115, the SNR values may be translated into a DRC value. As will be seen in further detail below, a particular weight function may be computed for each mobile station 105, based on one or more of the satisfaction metric, dissatisfaction metric and DRC.

The weights computed at function 220 may be positive or negative. Accordingly, the scheduled user is chosen to match the decision by the scheduler 119 that has the higher resultant weight function that is positive (not zero or negative). Hence, if there is no user with a zero or negative resultant weight function (output of function 230 is NO), then no user will be scheduled and the airlink slot will be idled (function 240). Accordingly, the mobile station 105 with the highest positive valued weight is selected (function 250) as the user to be served, or scheduled, to receive a next scheduled transmission in the current airlink slot.

Scheduling with Minimum Throughput Enforcement

The scheduler 119 should satisfy the minimum throughput requirements ($R_i^{min}$) for a substantially large fraction, such as about 90% or more of the mobile stations 105. While doing so, the scheduler 119 should also exploit multi-user diversity arising from temporal variations in channel quality, in order to achieve better efficiency for system 100.

Accordingly, the scheduler 119 may be configured so as to combine the benefits of a control mechanism designed to meet user satisfaction, together with benefits of peak picking (capacity enhancement, lower interference, and higher revenue). For example, at each scheduling instant (i.e., slot n), the scheduler 119 decides whether to schedule a poor user (mobile station 105) that has a relatively high valued dissatisfaction metric, thus indicating that the user has been falling short of its $R_i^{min}$, or whether to perform peak picking (i.e., schedule the user with the highest requested rate (highest DRC)). Peak picking helps maximize system 100 throughput, and may also allow the completion of packet calls for "good" users (mobile stations 105), thereby freeing system 100 resources for "poor" users.

In general, user satisfaction may be heavily limited by the resource allocation to the poor users, since these are typically the hardest to satisfy. Poor users typically need to be scheduled frequently in order to meet their target minimum throughputs. However, in accordance with the exemplary embodiments, the time instants or slots at which poor users are scheduled depend on (a) the dissatisfaction metric, i.e., current dissatisfaction level relative to $R_i^{min}$, an (b) current requested (or achievable) rate (i.e., DRC).

In order to track how well the scheduler 119 is meeting each user's minimum throughput target, scheduler 119 may employ a well-known "leaky bucket algorithm". The leaky bucket algorithm uses a token counter that maintains a token pool Ti(n) of bits for an i-th user in an n-th slot. This token counter is the aforementioned second token counter, and increments or decrements token counts. A token count represents the aforementioned dissatisfaction metric that is determined for each mobile station 105 in a given slot.

The counter may be incremented at user i's target minimum throughput, i.e., $R_i^{min}$ (bps), or by a quantity proportional to $R_i^{min}$ in the $n^{th}$ slot. Whenever the scheduler 119 transmits $b_i$ scheduled bits to user i, $b_i$ bits may be withdrawn from user i's "token bucket". The term $b_i(n)$ is referred to as a depletion rate, and may represent the number of bits transmitted to the $i^{th}$ user in the $n^{th}$ slot (in bits/slot). In practice, the traditional leaky bucket algorithm should be modified to operate acceptably within the context of 1x-EV-DO scheduling.

For example, refinements are needed to halt the accumulation of tokens when mobiles are idle for long periods of time, as is the case for users surfing the web or running other applications that sporadically generate traffic. In addition, the initial amount of tokens placed in each user's bucket at the time a transmission begins has a large influence on the delay performance of applications sporadically transmitting data. Accordingly, the token counts of the token counter may be restricted to a specified range, and may be initialized to provide acceptable delay performance of applications sporadically transmitting data, for example.

A. Range Restriction—Limiting the Depth of the Token Bucket

The size of the token pool $T_i(n)$ is a good indicator of user i's dissatisfaction. A mobile station 105 who has not been served over a considerable period of time could accumulate a fairly large number of tokens. Conversely, for a mobile station 105 who is served often, the size of the token pool could even take on negative values. Any token-based scheduling scheme thus has an built-in memory that reflects the service given to a user over a period of time. In the exemplary embodiment, this memory may be a sliding window in scheduler 119. The memory may be effective in providing a degree of user satisfaction, but can could a handicap if tokens are allowed to "run away", i.e., take on an excessively large negative or positive value. In such situations, system recovery may be slow, starving some users in the meantime, while providing unnecessary service to others.

In the exemplary embodiments in accordance with the present invention, this problem is addressed by capping token values, i.e., by restricting them to a given range ($T_{MIN}$, $T_{MAX}$). The maximum allowed bucket size, $T_{MAX}$, limits the memory in the sense that if the token bucket is already full of tokens, incoming tokens overflow and are not available in the future. Thus, at any time, the largest burst a user can send into the network (i.e., system 100) is roughly proportional to the size of the bucket. Similarly, the token count cannot fall below a minimum, $T_{MIN}$.

The rate at which tokens are placed in a user's (mobile station 105) bucket in each slot is typically much smaller than the depletion rate $b_i(n)$. Thus, recovery from very large negative token values is slow. For example, consider a case of a user with good channel conditions in a lightly loaded system, who experiences repeated service initially, leading to a large negative token value. If the system load now begins to increase, or if the systems' channel condition suddenly deteriorates significantly, the user will not be able to contend with other users with high token values.

Consequently, the user will not be scheduled for a considerable amount of time. Accordingly, to solve this problem, the length of time during which a backlogged user with negative tokens is not served may be tracked. Once this duration crosses some specified or pre-determined threshold, the user's tokens are reset by a token value initialization procedure. This "efficient token scheme" therefore may permit a controlled degree of burstiness, maximizing the advantage gained through multi-user diversity, while still attempting to guarantee, in the long-term, that the transmission rate for any backlogged user i will not exceed the token replacement rate.

B. Initialization of Token Value for New User

The token value of a new mobile station 105 entering the system 100 should be set. If the scheduler 119 sets the initial token value for a new user too low, the initial packet transmitted to the new mobile station 105 will experience a larger than desirable delay. This may affect Transmission Control Protocol (TCP). TCP is a byte-stream, connection-oriented, reliable delivery transport layer currently documented by IETF RFC 793, a standards document specified by the Internet Engineering Task Force (IETF) to describe how TCP should behave. In the TCP/IP model, TCP provides an interface between a network layer below and an application layer above.

In the case of TCP, this initial delay can lengthen the amount of time TCP remains in its slow-start phase. Slow start phase of TCP is the phase during which TCP is discovering the available channel bandwidth. If this process is slow, then the time taken by TCP to learn is large and hence the resulting throughput would be lowered, reducing TCP throughput seen by the mobile station 105. On the other hand, setting the token too high will guarantee service to the mobile station 105 for an unreasonably long period of time, thus penalizing other mobile stations 105 in system 100.

For a user j (i.e., a mobile station 105), entering the system 100 at time n, the tokens $T_j(n)$ are initialized so that if not served within m slots, the user's projected weights will equal the weight of the currently served user. In other words, if parameter $A^{max}[n-1]$ represents a number of weights corresponding to the user scheduled in slot (n−1), user j's tokens, represented as $T_j(n)$ are initialized to a value as evidenced by the following expression (1).

$$A^{max}(n-1) = (1 + \delta_j)\log(DRC_j(n)) + a_j(T_j(n) + mX_j) \quad (1)$$

$$\text{i.e., } T_j(n) = \frac{A^{max} - (1 + \delta_j)\log(DRCj(n))}{a_j} - mX_j$$

In expression (1), $\delta_j$ is a rate request exponent for user j; $DRC_j$, is the current rate requested by user j, and $a_j$ represents a user satisfaction bias for user j. The parameter Xj is proportional to $R_j^{min}$ and in particular is a token rate is given by the following expression (2):

$$X_j = \alpha_j R_j^{min}/600 \text{(bits/sec)}, \quad (2)$$

where αj is a tunable parameter and $R_j^{min}$ represents the target minimum throughput (e.g., $R_{min}$) for user j. Since the token rate is computed directly from $R_j^{min}$, it is QoS class-dependent. If $DRC_j(n)=0$, then $T_j(n)$ may be calculated as defined in expression (3):

$$A^{max} = (1 + \delta_j)\log(38400) + a_j(T_j(n) + mX_j) \quad (3)$$

$$\text{i.e., } T_j(n) = \frac{A^{max} - (1 + \delta_j)\log(38400)}{a_j} - mX_j,$$

where m can be selected as required. Accordingly, an initial token value may be set in accordance with expressions (1) to (3) so as to account for any delay due to applications sporadically transmitting data, for example C. Weight Functions for $R_i^{min}$ Enforcement The scheduler 119 assesses the relative benefits of scheduling relatively dissatisfied users and peak picking by comparing individual weight functions computed by the following two scheduling routines: The first scheduling routine is a channel quality and user dissatisfaction sensitive scheduling routine, which computes a weight function defined by expression (4):

$$w_i^1 = DRC_i^{(1+\delta_i)} \exp(a_i T_i), \quad (4)$$

where $DRC_i$ denotes the rate requested, $\delta_i$ denotes a rate request exponent, and $a_i$ denotes a small positive value that is related to the QoS class of the user. The parameter $a_i$ may be set to a small value to ensure algorithm stability, for example, such as 0.0001 for bronze class (class of users paying a lower subscription fee) and 0.0005 for a gold class. $T_i$ denotes the current token count value, respectively, for the $i^{th}$ user.

The second scheduling routine is a pure peak picking scheduler, with weight function given by expression (5):

$$w_i^2 = DRC_i, \quad (5)$$

Expressions (4) and (5) are implemented by scheduled 119 for each mobile station 105. The scheduled user is then chosen by scheduler 119 to match the decision by the scheduling routine in expressions (4) and (5) that has the higher resultant weight function, i.e., $$j = \underset{i: w_i^1 \times w_i^2 > 0}{\operatorname{argmax}} \{W_i^1, W_i^2\}. \quad (6)$$

In expression (6) above, both $w_i^1$ and $w_i^2$ must be positive. Hence, if there is no user with both $w^{i1}$ and $w^{i2}$ positive, then no user will be scheduled and the airlink slot will be idled (see for example, functions 230 and 240 in FIG. 2).

To enforce $R_i^{min}$ when scheduling transmissions in accordance with the exemplary embodiments of the present invention, user tokens are employed as a measure of temporal dissatisfaction, hence $T_i$ is a token count value that represents the aforementioned dissatisfaction metric. Tokens are decremented when a user (i.e., mobile station 105) is scheduled. Tokens are incremented, irrespective of whether the user has been scheduled or not, by an amount proportional to the user's target minimum throughput ($R_i^{min}$). At any instant, the accumulated tokens may be roughly proportional to the difference between the token rate, which may be a rate set to at least equal $R_i^{min}$, and the actual served rate that the user is experiencing. When a user is dissatisfied (i.e., perceived rate is below token rate), its tokens accumulate. The exponential term in expression (4) eventually starts to dominate the user channel quality and the user gets scheduled. When all users are satisfied, their tokens are negative and the scheduling method, as evidenced by the scheduling routines in expressions then depends solely on the user channel quality to make a scheduling decision. In other words, distribution of excess bandwidth among users depends primarily on user channel quality, and users with better DRC get a larger share of the channel.

Scheduling with Maximum Throughput $R_i^{max}$ Enforcement

For maximum throughput enforcement, an approach similar to the minimum throughput case described above may be followed. A new token counter, which is the aforementioned first token counter, may be defined, which may be another software routine implemented by scheduler 119. The token count value for an i-th user, $T_i^{Rmax}$ may represent the aforementioned satisfaction metric, and may be incremented or decremented by the token counter to track the target maximum throughput for user i, $R_i^{max}$. This token counter may incremented at the user's target maximum throughput ($R_i^{max}$) in each slot, and decremented by the number of bits $b_i$ that have already been transmitted to the user. Identical lower and upper bounds, and initialization procedures, as described in sections A. and B. above, may be applied to both minimum and maximum rate token values.

For scheduling with $R_i^{max}$ enforcement, two different scenarios are considered: (a) a Token Threshold Scheme (TTS); and (b) a Peak Picking Enhanced Airlink $R_i^{max}$ Enforcement (PEARmax) scheme.

A. Token Threshold Scheme (TTS)

In the TTS, if the maximum rate tokens $T_i^{Rmax}$ for all users are negative, then users whose maximum rate tokens drop below a certain threshold (threshold could be set to zero, for example) are excluded from scheduling. The scheduling routines in expressions (4) through (6) described earlier are then applied to the remaining users to compute the weights $W_i^1$ and $W_i^2$ and one user is selected, so long as there is a user with both $W_i^1$ and $W_i^2$ non-zero. Otherwise, no user will be scheduled and the airlink slot will be idled (see for example, functions 230 and 240 in FIG. 2).

B. Peak Picking Enhanced Airlink $R_i^{max}$ Enforcement (PEARmax)

In this case, a more channel sensitive approach may be applied in order to decide when to idle the channel in enforcing $R_i^{max}$ for all users. This ensures that the sector activity is reduced while still meeting target minimum and target maximum throughput requirements. The PEARmax scheme applies the following steps, in order.

Step 1: For the subset of users with non-negative token count values of $T_i^{Rmax}$, i.e., $T_i^{Rmax} \geq 0$, the weight computation may be done via expressions (4) through (6), where expressions (4) and (5) may be condensed into the following expression (7):

$$w_i(n) = \max\{[DRC_i(n)]^{1+\delta} \cdot e^{aT_i(n)}, DRC_i(n)\}, \quad (7)$$

where $DRC_i(n)$ denotes the rate requested by the $i^{th}$ user in slot n, $\delta$ represents a rate request exponent, and a denotes a small positive value that is related to the QoS class of the user. The parameter a is tunable and may be set to a small value to ensure algorithm stability, for example, such as 0.0001 for bronze class (class of users paying a lower subscription fee) and 0.0005 for a gold class. $T_i(n)$ denotes the current token value (i.e., the dissatisfaction metric) for the $i^{th}$ user in slot n. For the $i^{th}$ user in slot n, $T_i^{Rmax}$ may be incremented or decremented in accordance with expression (8):

$$T_i^{Rmax}(n) = T_i^{Rmax}(n-1) + X_i^{Rmax}(n) - b_i(n), \quad (8)$$

with $X_i^{Rmax}(n) = \alpha R_i^{max}/600(\text{bits/slot});$ where $X_i^{Rmax}(n)$ is proportional to $R_i^{max}$ and is a token rate that represents a product of $R_i^{max}$ and the slot duration, $\alpha$ is a tunable parameter that permits the token rate to be set at a value higher than the target maximum throughput for a given period, and $b_i(n)$ represents the number of bits transmitted to the $i^{th}$ user in the $n^{th}$ slot.

Step 2: For all users with negative token count values of $T_i^{Rmax}$, i.e., $T_i^{Rmax} < 0$, the weight computation may be done via expression (9):

$$W_i^3 = DRC_i^{(1+\delta_i)} \exp(a_i T_i^{Rmax}). \quad (9)$$

Expression (9) is similar to the first channel quality and user satisfaction sensitive scheduling routine of expression (4). In implementing expression (9), scheduler 119 attempts to achieve a minimum rate of $R_i^{max}$ for all users. For example, if $W_i^3 < R_{max}$, then $W_i^3$ is set to 0. Step 2 thus allows users who have already exceeded $R_i^{max}$ (i.e., the satisfaction metric or token count value $T_i^{Rmax}$ is a large negative value) to be scheduled if they are experiencing exceptionally good channel conditions. Similarly, users who have barely met their $R_i^{max}$ (i.e., $T_i^{Rmax}$ is a small negative value) will not be scheduled if they are in a relatively poor channel condition.

Step 3: The scheduled user j is then chosen as evidenced by expression (10):

$$j = \underset{i: W_i^1 \times W_i^2 \times W_i^3 > 0}{\arg\max} \{W_i^1, W_i^2, W_i^3\}. \quad (10)$$

If no user satisfies the condition $w_i^1 \times w_i^2 \times w_i^3 > 0$, then the scheduler 119 idles the slot, as previously described. This ensures that even after target minimum throughputs (i.e., $R_i^{min}$) are achieved, peak picking and user satisfaction scheduling may be selectively employed in order to efficiently achieve target maximum throughputs (i.e., $R_i^{max}$) for all users. This increases the number of time slots during which the sector does not need to schedule any user, and can turn off transmission during those idle time slots, thereby potentially reducing interference and improving energy efficiency.

EXAMPLES AND RESULTS

In this first example, a simulation was conducted in which ns-2 (Network Simulator Version 2, a well-known simulation tool) was used as the simulation tool and link level data was used that provided the DRC feedback for every slot. The link level data assumed a mobile speed of 3 km/hr and single-path Rayleigh fading. The link level data incorporated IR and provided the DRC feedback, i.e., the information on how many slots would be needed, should the mobile be scheduled in that slot. The link level data also showed whether a frame carrying the link level data was correctly received or not after a maximum number of incremental redundancy (IR) retransmissions.

Radio Link Protocol (RLP) was also employed for retransmitting any RLP frames lost on the airlink. Since any loss of TCP segments could have severely impacted the resulting TCP throughput, it was necessary to model the functionality of the RLP protocol. File Transfer Protocol (FTP) was used as the application layer protocol. The File Transfer Protocol (FFP) is a protocol that is able to transfer files between machines with widely different operating systems. FTP is an 8-bit protocol, capable of handling any type of file without further processing such as Multipurpose Internet Mail Extensions (MIME) or UUEncode, for example.

TCP Reno was used with a MSS (Maximum Segment Size—the maximum amount of TCP data that a node can send in one segment) of 1460 Bytes and a Maximum Window (MW) of 64 KB. The core network that connected the base station with the Host was assumed to operate at 5 Mb/s with a delay of 150 ms. A fixed delay of 100 ms was assumed between the RLP sender and receiver.

In analyzing the numerical results, two issues were evaluated: (a) Was $R_i^{max}$ being imposed?; and (b) How much system resources were needed to meet $R_i^{max}$ (in other words, how much airlink activity was required?). These issues were of focus because, all other parameters or conditions being equal, it is better to achieve $R_i^{max}$ in as few slots as possible so that the remaining slots can be idled. By idling these slots, a cell may effectively reduce the interference level seen by neighboring cells, potentially improving throughputs in these neighboring cells.

For the simulation, $R_i^{min}$ was set to 19.2 Kb/s; $R_i^{max}$ took two different values. In one case, $R_i^{max}$ was set to 2.5 Mb/s, signifying a case when the $R_i^{max}$ constraint was inactive. Other scheduling parameters were set as follows for all users: $\delta_i=0$, $a_i=3e^{-5}$, $T_i=R_i/600$. The following Table 1 provides a comparison of results for three cases: (1) a case where scheduling was performed when the $R_i^{max}$ constraint was inactive; (2) a case where scheduling was performed in accordance with the PEARmax scheme described above; and (3) a case where scheduling was performed in accordance with the TTS scheme described above.

TABLE 1

Comparison of Results for Three users

| $R_i^{max}$ Enforcement Scheme | User Throughputs | | | |
|---|---|---|---|---|
| | User 1 | User 2 | User 3 | % Activity |
| No $R_i^{max}$ | 773.4 | 141.4 | 77.1 | 99.87 |
| PEARmax | 78.44 | 78.34 | 78.25 | 29.17 |
| TTS | 78.7 | 77.76 | 77.5 | 47.4 |

Referring to Table 1, a system containing three users was assumed for simplicity, and the three users were chosen such that their average DRC values exceeded 80 Kb/s. User 1 is the user in the best location (i.e. highest average DRC), followed by User 2 and then by User 3. Table 1 shows results obtained through different $R_i^{max}$ enforcement schemes. Consider the case when no $R_i^{max}$ constraint was imposed. In this case, all users achieve throughputs of at least 19.2 Kb/s, since by design, the PEARmax scheme described above will maximize system throughput subject to minimum (19.2 Kb/s) and maximum (2.5 Mb/s) throughput constraints. Since Users 3, 2 and 1 have increasingly better channel conditions, their throughputs are also in that order. However, airlink activity is almost 100% for the "No $R_i^{max}$" case. The activity is not quite 100% since there were short periods when all three users reported a zero DRC, and/or all the three users had zero backlog (for example, during TCP slow start).

In the above example, a case was considered where $R_i^{max}$ was limited to 80 Kb/s using the PEARmax scheme for scheduling transmissions. From Table 1, none of the users exceeded a throughput of 80 Kb/s, since by design the PEARmax scheme limits the maximum user throughputs to $R_i^{max}$. One observation is that the airlink activity drops by more than 70%, to 29.17%. If this result is used with that of the TTS scheme, while the TTS scheme also enforces $R_i^{max}$, it does so by using about 62% more airlink resources (from 29.17 to 47.4%) than PEARmax. This example thus highlights the system level impact of channel sensitive scheduling schemes.

In the next example, a case was considered in which $R_i^{min}$ and $R_i^{max}$ were set to 19.2 Kb/s. This may correspond to target throughputs for users of a system implementing applications with tight jitter requirements, such as streaming audio or video. Alternatively, setting $R_i^{min}=R_i^{max}$ may be viewed as a means of providing predictable service to the end users, i.e., if the user sees little change in the throughputs for a wide range of channel conditions, the service starts to become more predictable. The following Table 2 provides a comparison of results for the aforementioned three cases:

TABLE 2

| $R_i^{max}$ Enforcement Scheme | Results for $R_i^{min} = R_i^{max} = 19.2$ Kb/s | | | |
|---|---|---|---|---|
| | User Throughputs | | | |
| | User 1 | User 2 | User 3 | % Activity |
| No $R_i^{max}$ | 773.4 | 141.4 | 77.1 | 99.87 |
| PEARmax | 19.56 | 19.5 | 19.5 | 6.69 |
| TTS | 19.06 | 19.26 | 19.25 | 11.18 |

Table 2 summarizes the results with $R_i^{min}$ and $R_i^{max}$ set to 19.2 Kb/s. Again, when there is no $R_i^{max}$ limit, the airlink activity is almost 100%. With PEARmax, all three users achieve throughputs of about 19.2 Kb/s and the airlink activity is reduced by more than 93%. TTS also achieves the individual user throughputs of 19.2 Kb/s, however, it uses 67% more airlink resources than PEARmax. Accordingly, the PEARmax scheduling method may meet minimum and maximum throughput constraints with significant savings in the amount of system resources. Moreover, the reduction of interference seen in neighboring sectors could result in throughput improvements in those sectors.

Therefore, the exemplary embodiments provide a method of scheduling transmissions in a communication system that might help ensure that a scheduler does not allow a mobile station (user) to exceed a maximum throughput constraint outside of a given time period. Within the given time period, the user may temporarily exceed these constraints if instantaneous channel conditions, as evidenced by a value of a satisfaction metric, $T_i^{R max}$, for example, are favorable. The user is not blocked from scheduling if the user's achieved (actual) data rate exceeds $R_i^{max}$, but a user may be blocked from being scheduled in an $n^{th}$ timeslot based on the current channel conditions as well as the service quality (throughput) the user has achieved thus far.

The exemplary embodiments provide a scheduler and method of scheduling sensitive to channel conditions, which may (i) enable the method to maximize user satisfaction by achieving QoS class-specific minimum throughput targets, (ii) enforce QoS class-specific maximum throughputs to provide users with an incentive to upgrade service, and (iii) reduce sector activity by reducing the number of resources, in terms of the airlink slots, for example, that need to be used by the system or network.

In order to reduce the amount of resources needed to achieve maximum throughput, channel state information may be used by the scheduler to dynamically decide if a current time slot needs to be allocated to (a) satisfy minimum rates for the users; (b) satisfy network or system throughput, or (c) if the current time slot needs to be idled, in the case that maximum throughput constraints or limits have been achieved for all users. Parameters utilized by the method may be easily tuned and may have a direct relationship on user perceived performance. Simulation results illustrate that minimum and maximum throughputs can be enforced efficiently using the method in accordance with the exemplary embodiments, and in a typical 1x-EV-DO operating scenario, more than 60% savings in system resources could be achieved. The exemplary embodiments of the present invention may also provide reduced interference, so as to potentially improve overall network and/or system capacity in interference-limited deployments.

Accordingly, the exemplary embodiments of the present invention provide a method for scheduling transmissions in a communication system so as to maximize user satisfaction by achieving QoS class-specific minimum throughput targets; and enforce QoS class-specific maximum throughputs to provide users with an incentive to upgrade service and potentially reduce sector activity. The scheduling method in accordance with the exemplary embodiments may provide perceptible differences to end users belonging to different QoS classes, and tangible benefits to network operators (i.e., higher system capacity, more predictable data transfers, increased revenue). Direct relationships between parameters in the method and user-perceived performance may also ensure that method as implemented is substantially easy to tune, with predictable performance.

The exemplary embodiments of the present invention being thus described, it will be obvious that the same may be varied in many ways. For example, the exemplary embodiments of the present invention have specific applications to the scheduling of packet transmissions from a base station to mobile stations of a CDMA network, such as a CDMA network operating in accordance with the cdma2000 1x EV-DO standard. Accordingly, the exemplary embodiments described above may be implemented by a scheduler in such a network, and have been described in the context of a scheduler or scheduling function that is implemented by a base station controller.

However, the exemplary embodiments of the present invention are more general in range of applicability, as other useful applications are envisaged in communication networks of other kinds, including both wired and wireless networks. In particular, the exemplary embodiments are applicable not only for scheduling downlink transmissions, but also may be applicable for scheduling uplink transmissions in a CDMA system or other wireless network. Such variations as described above are not to be regarded as departure from the spirit and scope of the exemplary embodiments of the present invention, and all such modifications as would be obvious to one skilled in the art are intended to be included within the scope of the following claims.

We claim:

1. A method for scheduling transmissions to a plurality of users so as to enforce a minimum throughput constraint in a communication network, comprising:
   determining for each user in a given timeslot a dissatisfaction metric based on a channel quality, the dissatisfaction metric being a token count of a token counter that tracks an achieved performance relative to a target minimum throughput for each user;
   computing a first weight function for each user based on a rate requested by each user, an exponential function of the dissatisfaction metric and a quality of service class for each user;
   computing a second weight function for each user based on the rate requested by each user; and
   scheduling at least one user in a given timeslot to be served in a next scheduled transmission based on the first and second weight functions.

2. The method of claim 1, wherein the token counter is decremented when each user is scheduled and incremented at each user's target minimum throughput.

3. The method of claim 1, wherein the first weight function of each user is defined by $$w_i^1 = DRC_i^{1+\delta} \cdot e^{aT_i(n)},$$

where $DRC_i$ denotes the rate requested by the ith user, $\delta$ represents a rate request exponent, a denotes a tunable parameter and $T_i$ denotes the dissatisfaction metric for the ith user; and the second weight function is defined by $$w_i^2 = DRC_i.$$

4. The method of claim 1, wherein the target minimum throughput is a function of at least one of a quality of service (QoS) class assigned by the network to each user and a QoS class requested by each user at the start of a data session.

5. A method for scheduling transmissions to a plurality of users so as to enforce a maximum throughput constraint in a communication network, comprising:
   determining, for each user in a given timeslot a satisfaction metric based on a channel quality, the satisfaction metric being a token count of a token counter that tracks an achieved performance relative to a target maximum throughput for each user;
   computing a first weight function if the determined satisfaction metric is 0 or greater;
   computing a second weight function if the determined satisfaction metric is negative, the second weight function being based on a rate requested by each user, an exponential function of the dissatisfaction metric and a quality of service class for each user; and
   scheduling at least one of said plurality of users in the given timeslot to be served in a next scheduled transmission based on the sign of the satisfaction metric, while enforcing maximum throughput constraints for said plurality of users.

6. The method of claim 5, further comprising:
   maintaining a token counter for each user that tracks each user's achieved performance relative to the target maximum throughput of the user.

7. The method of claim 6, wherein the token counter for each user is incremented as a function of each user's target maximum throughput in each slot, and decremented by the number of bits transmitted when each user is scheduled.

8. The method of claim 5, wherein said second weight function is defined by $$w_i = DRC_i^{1+\delta_i} \cdot e^{a_i T_i^{R_{max}}},$$

where $DRC_i$ denotes the rate requested by the ith user, $\delta$ represents a rate request exponent, $a_i$ denotes a tunable parameter and $T_i^{R_{max}}$ represents the satisfaction metric for the ith user.

9. The method of claim 8, wherein said scheduling further includes selecting a user of the plurality of users having a highest positive resultant weight function to be served during a next scheduled transmission, else idling the given timeslot of the next scheduled transmission.

10. The method of claim 5, wherein the target maximum throughput is a function of at least one of a quality of service (QoS) class assigned by the network to each user and a QoS class requested by each user at the start of a data session.

* * * * *